Oct. 12, 1926.

D. CUTHBERT

CREAM SEPARATOR

Filed March 14, 1925

1,602,752

Inventor
D. Cuthbert
By Marks & Clerk
Attys.

Patented Oct. 12, 1926.

1,602,752

UNITED STATES PATENT OFFICE.

DAVID CUTHBERT, OF BIRKENHEAD, AUCKLAND, NEW ZEALAND.

CREAM SEPARATOR.

Application filed March 14, 1925. Serial No. 15,577.

This invention relates to cream separators, and has for its object the provision of an improved form of disc therefor, by means of which the separation of the cream and milk is rendered more expeditious and efficient.

According to the invention, every alternate disc of the separator has stamped or formed in its upper face or side a number of spiral grooves or corrugations. The remaining discs are of the usual plain formation.

The upper faces of the corrugated discs are adapted to contact against the under faces of the plain discs immediately above them, while the underfaces of the said corrugated discs are provided with ribs or spacers whereby they are held apart from the plain discs next below them.

The corrugations or grooves therefor provide between each contacting plain and corrugated disc, spiral passages commencing at or near the outer or lower edges of said discs and after completely encircling the latter one or more times, lead to the upper or inner edges of the discs to communicate with the cream discharge ports.

Perforations or holes are provided through the corrugations or grooves in order to establish communication between the spiral passages and the spaces between each adjoining pair of contacting discs, on the underside of each corrugated disc.

The milk to be separated is adapted to circulate freely in these spaces between the pairs of contacting discs, while the cream which arises on said milk is adapted to be skimmed off by and to pass through said holes or perforations into the spiral passages along which latter it is lead to the cream discharge ports of the separator bowl.

The invention will be more particularly described in conjunction with the accompanying drawing, wherein:—

Figure 1:
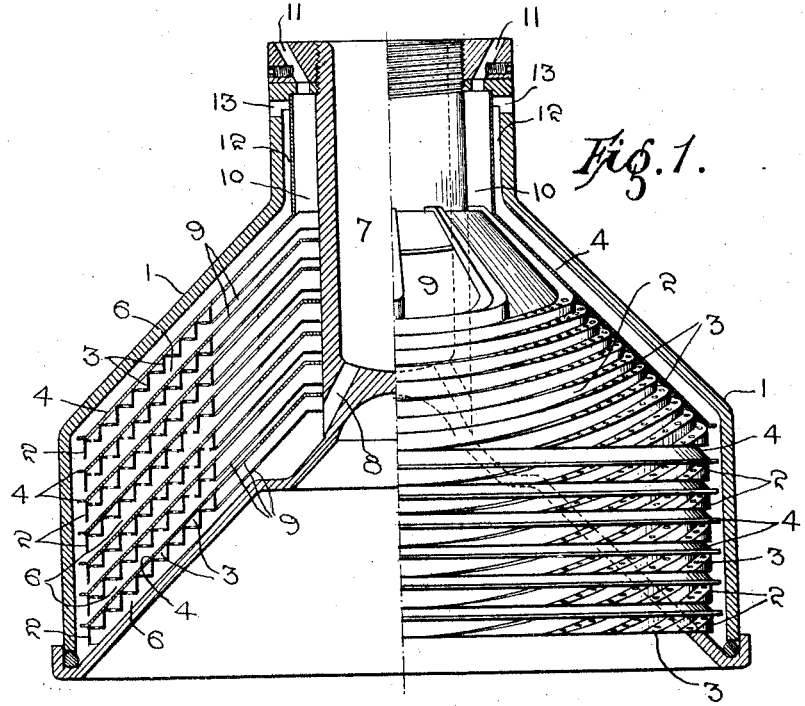
Figure 2:
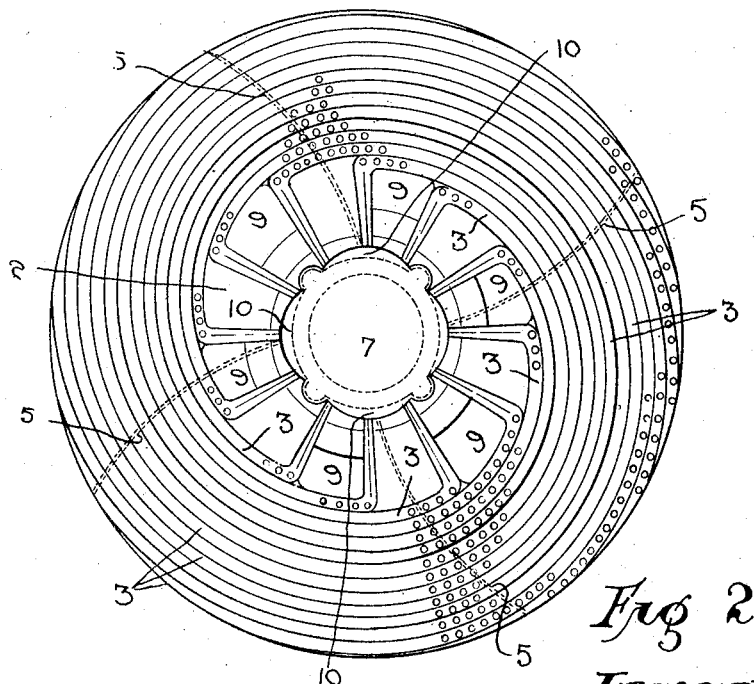

Figure 1 is a sectional elevation of a separator centrifugal bowl showing the discs therein, partly in elevation and partly in sectional elevation, and Figure 2 is a plan view of one of the corrugated discs.

Every alternate disc 2 in the centrifugal bowl 1 of a cream separator has stamped or formed in its upper face, a plurality of spiral grooves or corrugations 3 commencing at or near its lower or outer edge and after completely encircling the disc one or more times, leading to the inner or upper edges of the said discs.

The remaining discs 4 of the bowl 1 are of the usual plain conical formation or shape.

The discs 2 and 4 are arranged in pairs in the bowl 1, that is, the upper face of each corrugated disc 2 contacts with the under face of the plain disc 4 immediately above it, while spacers or ribs 5 formed on the underfaces of the corrugated discs 2 keep the latter apart from the plain discs next below them.

By this means, the upper faces of the grooves or corrugations 3 in the discs 2 are closed by the discs 4, to convert said grooves or corrugations into passages leading in spiral direction from the bottom or outer edges of said discs to their upper or inner edges.

The undersides of the spiral corrugations 3 in the discs 2 are perforated as shown in the accompanying drawing.

It is also to be noted that the preferred formation of each corrugation or groove 3 is with a vertical wall 3' and an outer extending horizontal wall 3" and this latter wall is in each instance provided with holes or perforations 41 through which the cream passes from the milk. Owing to the formation of these corrugations and the direction in which the bowl revolves a force is set up which drives or forces the cream rapidly to the center facilitating the rate of speed of separation. In so doing the cream does not pass through the milk as it does in the more usual methods of separation.

By reason of the spacers or ribs 5 on the undersides of the discs 2 whereby the latter are kept apart from the plain discs 4 next below them, spaces 6 are provided between each pair of plain and corrugated discs.

Milk to be separated is fed into the centrifugal bowl 1 through the inlet passage 7, and issues from the latter, through ports 8, into the space below the lowermost disc 2 in the bowl.

The centrifugal force produced by the rapid rotation of the bowl 1 and discs 2 and 4 therein, then causes the milk to be distributed through the spaces 6 between the adjoining pairs of discs 2 and 4, communication between said spaces 6 being provided by means of ports or holes 9 formed through both the discs 2 and 4 near the upper or inner edges of the same. The uppermost disc 4 however does not contain any port or hole 9.

The cream rising to the surface of the milk in the spaces 6 is caught or skimmed off by the perforations or holes in the corrugations 3, with the result that said cream is passed into the passages formed by the latter up which it is lead or caused to travel by the rotary movement of the discs until it reaches the upper ends of the passages from which it is discharged to the cream discharge outlets 10 and discharge nut 11 in the top of the bowl 1.

The milk having passed upwards through the successive spaces 6 is brought at length above the uppermost disc 4 and is discharged through a passage 12 to the milk discharge ports 13.

By means of the perforated grooves 3 in the discs 2 as herein before described, the cream is separated from the milk immediately it rises to the surface of the latter, with the result that rapid and thorough skimming of said cream is effected.

I declare that what I claim and desire to obtain by Letters Patent of the United States of America is:—

1. Means for the purpose specified, including a centrifugal bowl having discharge ports; cone shaped discs positioned in said bowl and contacting in pairs, the upper disc of each pair being of plain construction while the lower disc is provided on its upper face with spiral grooves each having a vertical wall and a horizontal wall to provide a spiral passage between the said contacting discs leading from their lower or outer edges to their upper or inner edges, and means whereby the cream is collected in said passages to be delivered to the cream discharge ports of the bowl.

2. Means for the purpose specified, according to claim 1, wherein the under sides of the grooved discs have formed thereon ribs to hold the adjoining pairs of plain and corrugated discs apart.

3. Means for the purpose specified, according to claim 1, wherein the grooves in the lower disc of each pair thereof is perforated, said perforations being adapted to skim the cream off the milk flowing between the pairs of discs and to pass said cream into the spiral passages between the said pair of discs from which latter it is discharged to the cream outlet ports.

4. Means for the purpose specified, according to claim 1, wherein ports or holes are provided through the pairs of contacting discs near their upper or inner edges to provide passages through which the milk can pass from one to another of the spaces between said pairs of contacting discs.

5. Means for the purpose specified, according to claim 1, wherein the horizontal wall of each groove is provided with holes for skimming purposes, as set forth.

Signed at Auckland, in the Dominion of New Zealand, this 28th day of January, A. D., 1925.

DAVID CUTHBERT.